United States Patent
Li

(10) Patent No.: US 10,913,252 B2
(45) Date of Patent: Feb. 9, 2021

(54) BONDING DEVICE FOR FLEXIBLE PANEL AND METHOD FOR BONDING FLEXIBLE PANEL

(71) Applicant: Wuhan China Star Optoelectronics Semiconductor Display Technology Co., Ltd., Wuhan (CN)

(72) Inventor: Wu Li, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 68 days.

(21) Appl. No.: 16/319,354

(22) PCT Filed: Aug. 22, 2018

(86) PCT No.: PCT/CN2018/101675
§ 371 (c)(1),
(2) Date: Jan. 21, 2019

(87) PCT Pub. No.: WO2019/218511
PCT Pub. Date: Nov. 21, 2019

(65) Prior Publication Data
US 2020/0122446 A1   Apr. 23, 2020

(30) Foreign Application Priority Data

May 18, 2018 (CN) .......................... 2018 1 0477728

(51) Int. Cl.
*B32B 37/00* (2006.01)
*B32B 37/10* (2006.01)
(Continued)

(52) U.S. Cl.
CPC .......... *B32B 37/003* (2013.01); *B29C 65/787* (2013.01); *B29C 65/7841* (2013.01);
(Continued)

(58) Field of Classification Search
None
See application file for complete search history.

(56) References Cited

U.S. PATENT DOCUMENTS

| 6,648,043 B1 * | 11/2003 | Kundinger | ............ B29C 51/18 156/285 |
| 2014/0345791 A1 * | 11/2014 | Son | ................... H01L 51/0024 156/228 |
| 2018/0301643 A1 | 10/2018 | Xu | |

FOREIGN PATENT DOCUMENTS

| CN | 107039604 | 8/2017 |
| CN | 107452285 | 12/2017 |

(Continued)

*Primary Examiner* — Barbara J Musser

(57) ABSTRACT

The present disclosure provides a bonding device for a flexible panel including: a transport element, a vacuum chamber, a cover jig, and a bonding jig; wherein the transport element is configured to move the flexible panel into the vacuum chamber or move the flexible panel out of the vacuum chamber; wherein both the cover jig and the bonding jig are disposed in the vacuum chamber, the cover jig is opposite to the bonding jig, and the cover jig is configured to secure thereon a cover plate to be bonded; and wherein the bonding jig has a curved hump protruding toward the cover jig, and the hump is configured to raise the flexible plate up to the cover plate to bond the cover plate with the flexible panel when the transport element transports the flexible plate to a location below the cover plate.

10 Claims, 2 Drawing Sheets

(51) Int. Cl.
    *B29C 65/78*     (2006.01)
    *G06F 1/16*      (2006.01)
    *G09F 9/30*      (2006.01)
    *B29L 31/34*     (2006.01)
    *G02F 1/1333*    (2006.01)
    *B29C 65/00*     (2006.01)

(52) U.S. Cl.
    CPC ...... *B29C 66/8145* (2013.01); *B32B 37/0046* (2013.01); *B32B 37/10* (2013.01); *G02F 1/133305* (2013.01); *B29L 2031/3475* (2013.01); *B32B 2309/68* (2013.01); *B32B 2457/20* (2013.01); *B65H 2301/44335* (2013.01); *G06F 1/1652* (2013.01); *G09F 9/301* (2013.01)

(56) References Cited

FOREIGN PATENT DOCUMENTS

| | | |
|---|---|---|
| JP | 2005-038231 | 2/2005 |
| JP | 2016-081733 | 5/2016 |

\* cited by examiner

BONDING DEVICE FOR FLEXIBLE PANEL AND METHOD FOR BONDING FLEXIBLE PANEL

RELATED APPLICATIONS

This application is a National Phase of PCT Patent Application No. PCT/CN2018/101675 having International filing date of Aug. 22, 2018, which claims the benefit of priority of Chinese Patent Application No. 201810477728.1 filed on May 18, 2018. The contents of the above applications are all incorporated by reference as if fully set forth herein in their entirety.

FIELD AND BACKGROUND OF THE INVENTION

The present disclosure relates to the field of display technology, and more particularly to a bonding device for a flexible panel and a method for bonding a flexible panel.

Along with maturity of flexible organic light-emitting diodes (OLEDs), fronts of many mobile phones are currently designed as being curved. Furthermore, OLEDs combined with wearable devices make curved display devices more popular in the future. And curved display devices need to use a flexible bonding process.

At present, there are usually several bonding processes, where two will be discussed. The first includes disposing a flexible panel on a mould, wherein the flexible panel is defined as a panel including but not limited to a display panel of a single structure, a touch panel of a single structure, or a panel integrated with touch and display structures. Then a glass cover plate is held by a jig and moved to be put on the mould, and then the glass cover plate and the flexible panel which have been aligned are bonded together. Such a bonding method discussed above has following defects: a. The flexible panel, the glass cover plate and the jig cannot be aligned precisely. b. Curved periphery of the flexible panel is easy to have problems of dents, scratches, and insecure bonding after the bonding operation. c. That the jig and the mould cannot be easily aligned precisely makes the mould may damage the product in the bonding process. d. The jig and the mould are precisely fit to each other which makes air in the module cannot be easily exhausted when the jig moves into the module, whereby a long air exhausting time is required, and accordingly a low production efficiency is resulted; moreover, blisters can be easily formed in the product during the bonding process. The other method includes putting a hard cover plate into a mould having a configuration corresponding to the curved hard cover plate; a flexible panel is conformably bonded to the cover plate by using a roller pressing the flexible panel against the cover plate. The second bonding method above has following defects: a. During the bonding process, the position of the flexible plate is easily to be shifted from its intended position, which results in an imprecise bonding. b. This bonding method cannot not be used in products which have a small bending radius or a large bending angle.

So, the existing technology has detects needing urgent improvement.

SUMMARY OF THE INVENTION

The present disclosure provides a bonding device for a flexible panel and a method for bonding a flexible panel, which have advantages of eliminating the generation of blisters during a bonding process.

The present disclosure provides a bonding device for a flexible panel, which includes:

a transport element, a vacuum chamber, a cover jig, and a bonding jig;

wherein the transport element is configured to move the flexible panel into the vacuum chamber or move the flexible panel out of the vacuum chamber;

wherein both the cover jig and the bonding jig are disposed in the vacuum chamber, the cover jig is opposite to the bonding jig, and the cover jig is configured to secure thereon a cover plate to be bonded;

wherein the bonding jig has a curved hump protruding toward the cover jig, and the hump is configured to raise the flexible plate up to the cover plate to bond the cover plate with the flexible panel when the transport element transports the flexible plate to a location below the cover plate;

wherein the transport element includes a film configured to bond thereon the flexible panel and a transport part configured to move the film; and wherein the vacuum chamber includes a vacuuming part to pump air out of the vacuum chamber when the flexible panel is moved into the vacuum chamber.

According to the present disclosure, the film includes a viscous area configured to adhere thereon the flexible panel.

According to the present disclosure, a viscous force of the viscous area ranges from 20 gram per square centimeter to 3000 gram per square centimeter.

According to the present disclosure, the film includes a non-viscous area disposed on a side of the viscous area, and the bonding device includes a fixture disposed on the non-viscous area to stretch the film.

According to the present disclosure, wherein the film is circular.

According to the present disclosure, the hump is a flexible hump.

According to the present disclosure, the cover jig includes a groove matching a shape of the cover plate.

The present disclosure provides a bonding device for a flexible panel, which includes:

a transport element, a vacuum chamber, a cover jig, and a bonding jig;

wherein the transport element is configured to move the flexible panel into the vacuum chamber or move the flexible panel out of the vacuum chamber;

wherein both the cover jig and the bonding jig are disposed in the vacuum chamber, the cover jig is opposite to the bonding jig, and the cover jig is configured to secure thereon a cover plate to be bonded; and wherein the bonding jig has a curved hump protruding toward the cover jig, and the hump is configured to raise the flexible plate up to the cover plate to bond the cover plate with the flexible panel when the transport element transports the flexible plate to a location below the cover plate.

According to the present disclosure, the transport element includes a film configured to bond thereon the flexible panel and a transport part configured to move the film.

According to the present disclosure, the film includes a viscous area configured to adhere thereon the flexible panel.

According to the present disclosure, a viscous force of the viscous area ranges from 20 gram per square centimeter to 3000 gram per square centimeter.

According to the present disclosure, the film includes a non-viscous area disposed on a side of the viscous area, and the bonding device includes a fixture disposed on the non-viscous area to stretch the film.

According to the present disclosure, the vacuum chamber includes a vacuuming part to pump air out of the vacuum chamber when the flexible panel is moved into the vacuum chamber.

According to the present disclosure, the film is circular.

According to the present disclosure, the hump is a flexible hump.

According to the present disclosure, the cover jig includes a groove matching a shape of the cover plate.

The present disclosure provides a method for bonding a flexible panel, wherein the method includes following steps:

putting a cover plate on a cover jig, and securing the cover plate on the cover jig;

pasting the flexible panel on a film of a transport element, and removing a protection film on a surface of the flexible panel therefrom;

moving the flexible panel into a vacuum chamber by rotating the film through a transport part of the transport element;

stretching an area of the film where the flexible panel disposed, making the flexible plate to be suspended in the vacuum chamber;

pumping air out of the vacuum chamber;

raising the flexible panel up to the cover plate by a hump of the bonding jig to bond the cover plate with the flexible panel.

The present disclosure can bond the flexible panel and the cover plate secured on the cover jig for a reason that the hump disposed on the bonding jig is convenient for eliminating blisters possibly generated in the bonding process.

BRIEF DESCRIPTION OF THE SEVERAL VIEWS OF THE DRAWINGS

Aforementioned contents of the present disclosure will be a better understood with reference to the following description, appended claims and accompanying figures. Apparently, the drawings described below merely represent some embodiments of the present disclosure, and other drawings may be obtained according to these drawings by those skilled in the art without creative labor.

DETAILED DESCRIPTION OF SPECIFIC EMBODIMENTS OF THE INVENTION

Figure 1:
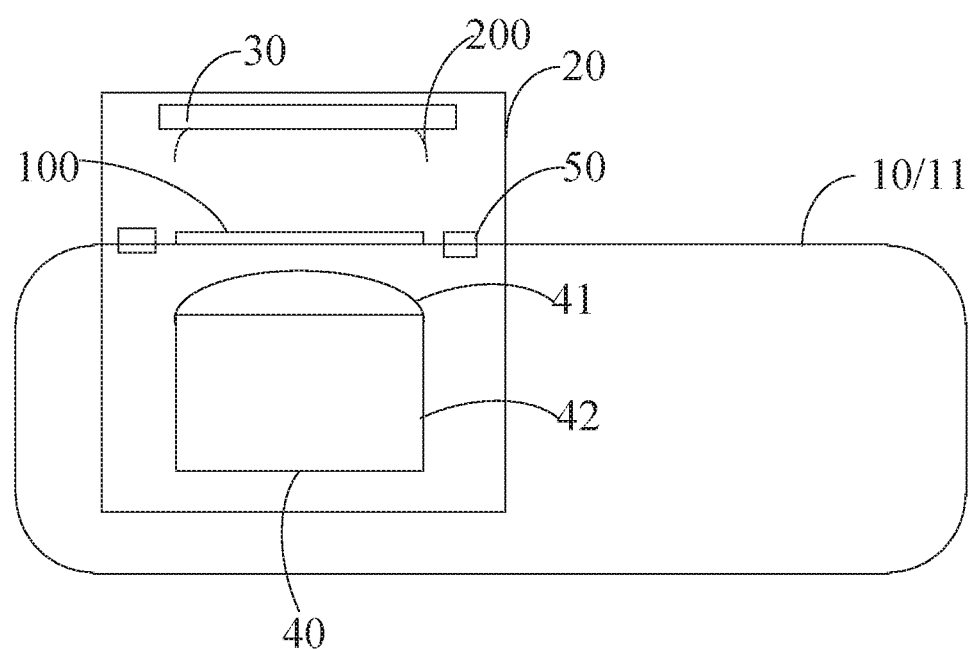
FIG. 1 is a structural schematic diagram of a bonding device for a flexible display device according to the present disclosure.

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the specification, it is to be understood that terms such as "central", "longitudinal", "lateral", "length", "width", "thickness", "upper", "lower", "front", "rear", "left", "right", "vertical", "horizontal", "top", "bottom", "inner", "outer", "clockwise" and "counterclockwise" should be construed to refer to the orientation as then described or as shown in the drawings under discussion. These relative terms are for convenience of description and do not require that the present invention be constructed or operated in a particular orientation. In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention. "a plurality of" means two or more than two, unless specified otherwise.

In the present invention, unless specified or limited otherwise, the terms "mounted", "connected", "coupled", "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed there between. Furthermore, a first feature "on", "above" or "on top of" a second feature may include an embodiment in which the first feature is right or obliquely "on", "above" or "on top of" the second feature, or just means that the first feature is at a height higher than that of the second feature; while a first feature "below", "under" or "on bottom of" a second feature may include an embodiment in which the first feature is right or obliquely "below", "under" or "on bottom of" the second feature, or just means that the first feature is at a height lower than that of the second feature.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

As shown in FIG. 1, FIG. 1 is a bonding device for a flexible device according to the present disclosure. The bonding device is configured to bond a flexible panel 100 and a cover plate 200. Wherein the flexible panel 100 is a liquid crystal display panel or an organic light-emitting diode display panel. The cover plate 200 is a curved glass cover plate. The bonding device includes a transport element 10, a vacuum chamber 20, a cover jig 30, and a bonding jig 40.

Wherein the transport element 10 is configured to move the flexible panel 100 into the vacuum chamber 20 or move the flexible panel 100 out of the vacuum chamber 20. Wherein the cover jig 30 and the bonding jig 40 are disposed in the vacuum chamber 20. The cover jig 30 is opposite to the bonding jig 40 and is spaced apart from the bonding jig 40 by a predetermined distance. The cover jig 30 is configured to secure thereon the cover plate 200 to be bonded. The bonding jig 40 has a curved hump 41 protruding toward the cover jig 30, and the hump 41 is configured to raise the flexible plate 100 up to the cover plate 200 to bond the cover plate 200 with the flexible panel 100 when the transport element 10 transports the flexible plate 100 to a location below the cover plate 200.

According to some disclosures, the transport element 10 includes a film 11 and a transport part configured to move the film 11. The transport element 10 may be driven through a motor. The film 11 is roughly circular and is configured to secure thereon the cover plate 100 to be bonded. The film 11 including a viscous area and a non-viscous area can be recycled. Wherein the viscous area having viscous force is configured to adhere thereon the flexible plate. The viscous area includes a viscous material layer to have viscous force. The viscous force of the viscous area ranges from 20 gram per square centimeter to 3000 gram per square centimeter. The non-viscous area is disposed on two sides of the viscous area.

The bonding device includes a fixture 50 disposed on the non-viscous area. The fixture 50 is used to stretch the film 11 of the viscous area disposed between the non-viscous areas.

According to the present disclosure, the vacuum chamber 20 includes a vacuuming part to pump air out of the vacuum chamber 20 after the flexible panel is moved into the vacuum chamber 20.

According to the present disclosure, the bonding jig 40 includes a main body 42 and a hump 41 disposed on the main body 42. The hump 41 is a flexible hump. The hump 41 is made of silica gel or rubber. The main body 42 and the hump 41 are integrative structure. It will be appreciated that the bonding device may also include a drive element. The drive element is configured to move the bonding jig 40 to the cover jig 30 to bond the flexible plate 100 with the cover plate 200 and drives the bonding jig 40 to original position after the flexible plate 100 is bonded with the cover plate 200.

According to some disclosures, the cover jig 30 includes a groove matching a shape of the cover plate 200.

The present disclosure can bond the flexible panel and the cover plate secured on the cover jig for a reason that the hump disposed on the bonding jig is convenient for eliminating blisters generated in the bonding process.

Figure 2:
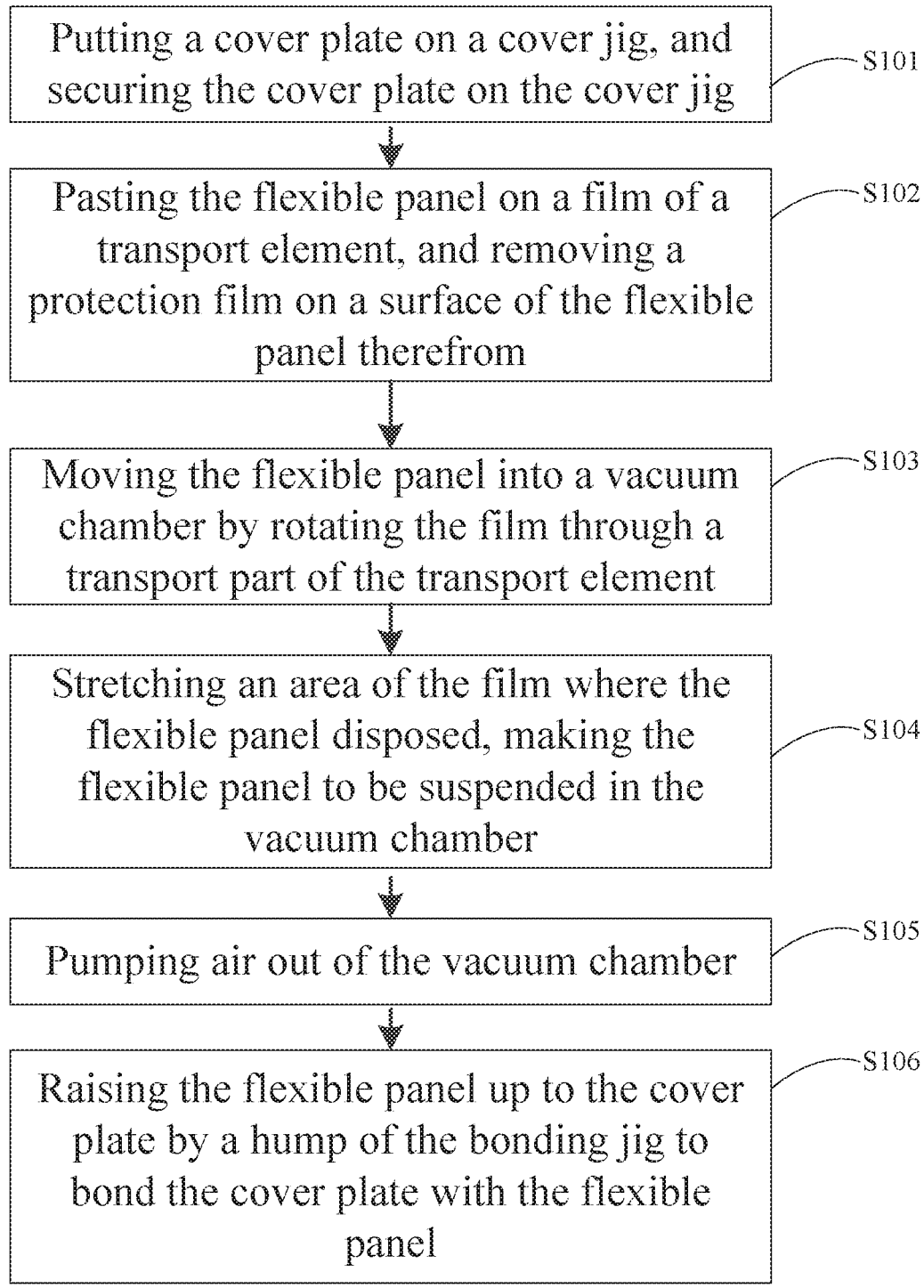
FIG. 2 is a flow diagram of a method for bonding a flexible panel according to the present disclosures.

Please also referring to FIG. 2, FIG. 2 is a flow diagram of a method for bonding a flexible panel according to some disclosures. The method using the bonding device for the flexible panel according to the embodiment above, and the method includes following steps:

S101. Putting a cover plate on a cover jig, and securing the cover plate on the cover jig.

Wherein the cover plate 200 is adsorbed on the cover jig 30 by vacuum adsorption. The cover jig 30 includes a groove matching a shape of the cover plate 200.

S102. Pasting the flexible panel on a film of a transport element, and removing a protection film on a surface of the flexible panel therefrom.

Disposing and aligning the flexible panel, and moving the protective film on the surface of the flexible panel 100 away. The film 11 is about circular. The film is configured to bond thereon the flexible panel 100. The film 11 including a viscous area and a non-viscous area can be recycled. Wherein the viscous area having a viscous feature is configured to adhere thereon the flexible panel. The viscous material layer is disposed on the viscous area to make the viscous area have the viscous feature. A viscous force of the viscous area ranges from 20 gram per square centimeter to 3000 gram per square centimeter. The non-viscous area disposed on two sides of the viscous area.

S103. Moving the flexible panel into a vacuum chamber by rotating the film through a transport part of the transport element.

Wherein the film 11 is a recycle film. The flexible panel 100 is moved into the vacuum chamber 20 after the flexible panel 100 is bonded on the film 11 at a location outside the vacuum chamber 20.

S104. Stretching an area of the film where the flexible panel disposed, making the flexible panel to be suspended in the vacuum chamber. Wherein stretching the viscous area of the film by disposing the jig on the non-viscous area of the film 11.

S105. Pumping air out of the vacuum chamber. Using the vacuuming part to pump air out of the vacuum chamber.

S106. Raising the flexible panel up to the cover plate by a hump of the bonding jig to bond the cover plate with the flexible panel.

Wherein the bonding jig driven by the drive element moves to the cover jig 30. A combination of the cover plate 200 and the flexible 100 is moved out of the vacuum chamber 20 along with the film, and the combination is removed from the film after the bonding operation. The bonding jig 40 includes a main body 42 and a hump 41 disposed on the main body 42. The hump 41 is a flexible hump. The hump 41 is made of silica gel or rubber. The main body 42 and the hump 41 are integrative structure. It will be appreciated that the bonding device may also include a drive element. The drive element is configured to move the bonding jig 40 to the cover jig 30 to bond the flexible plate 100 with the cover plate 200 and drives the bonding jig 40 to original position after the flexible plate 100 is bonded with the cover plate 200.

The present disclosure can bond the flexible panel and the cover plate secured on the cover jig for a reason that the hump disposed on the bonding jig is convenient for eliminating blisters possibly generated in the bonding process.

The present disclosure is described in detail in accordance with the above contents with the specific preferred examples. However, this present disclosure is not limited to the specific examples. For a person of ordinary skill in the art, on the premise of keeping the conception of the present disclosure, the technical personnel can also make simple deductions or replacements, all of which should be considered to belong to the protection scope of the present disclosure.

What is claimed is:

1. A bonding device for a flexible panel comprising:
    a transport element, a vacuum chamber, a cover jig, and a bonding jig;
    wherein the transport element is configured to move the flexible panel into the vacuum chamber or move the flexible panel out of the vacuum chamber;
    wherein both the cover jig and the bonding jig are disposed in the vacuum chamber, the cover jig is opposite to the bonding jig, and the cover jig is configured to secure thereon a cover plate to be bonded;
    wherein the bonding jig has a curved hump protruding toward the cover jig, and the hump is configured to raise the flexible panel up to the cover plate to bond the cover plate with the flexible panel when the transport element transports the flexible panel to a location below the cover plate;
    wherein the transport element comprises a film configured to bond thereon the flexible panel and a transport part, and the film is configured as a continuous loop and is rotated via the transport part to move the flexible panel into the vacuum chamber;

wherein the film comprises a viscous area configured to adhere thereon the flexible panel;

wherein the film comprises a non-viscous area disposed on a side of the viscous area, and the bonding device comprises a fixture disposed on the non-viscous area to stretch the film; and wherein the vacuum chamber comprises a vacuuming part to pump air out of the vacuum chamber when the flexible panel is moved into the vacuum chamber.

2. The bonding device for the flexible panel as claimed in claim 1, wherein a viscous force of the viscous area ranges from 20 gram per square centimeter to 3000 gram per square centimeter.

3. The bonding device for the flexible panel as claimed in claim 1, wherein the hump is a flexible hump.

4. The bonding device for the flexible panel as claimed in claim 1, wherein the cover jig comprises a groove matching a shape of the cover plate.

5. A bonding device for a flexible panel comprising:

a transport element, a vacuum chamber, a cover jig, and a bonding jig;

wherein the transport element is configured to move the flexible panel into the vacuum chamber or move the flexible panel out of the vacuum chamber;

wherein both the cover jig and the bonding jig are disposed in the vacuum chamber, the cover jig is opposite to the bonding jig, and the cover jig is configured to secure thereon a cover plate to be bonded;

wherein the film comprises a viscous area configured to adhere thereon the flexible panel;

wherein the film comprises a non-viscous area disposed on a side of the viscous area, and the bonding device comprises a fixture disposed on the non-viscous area to stretch the film; and wherein the bonding jig has a curved hump protruding toward the cover jig, and the hump is configured to raise the flexible panel up to the cover plate to bond the cover plate with the flexible panel when the transport element transports the flexible panel to a location below the cover plate;

wherein the transport element comprises a film configured to bond thereon the flexible panel and a transport part, and the film is configured as a continuous loop and is rotated via the transport part to move the flexible panel into the vacuum chamber.

6. The bonding device for the flexible panel as claimed in claim 5, wherein a viscous force of the viscous area ranges from 20 gram per square centimeter to 3000 gram per square centimeter.

7. The bonding device for the flexible panel as claimed in claim 5, wherein the vacuum chamber comprises a vacuuming part to pump air out of the vacuum chamber when the flexible panel is moved into the vacuum chamber.

8. The bonding device for the flexible panel as claimed in claim 5, wherein the hump is a flexible hump.

9. The bonding device for the flexible panel as claimed in claim 5, wherein the cover jig comprises a groove matching a shape of the cover plate.

10. A method for bonding a flexible panel, wherein the method comprises following steps:

putting a cover plate on a cover jig, and securing the cover plate on the cover jig;

pasting the flexible panel on a film of a transport element, and removing a protection film on a surface of the flexible panel therefrom, wherein the film is configured as a continuous loop;

wherein the film comprises a viscous area configured to adhere thereon the flexible panel;

wherein the film comprises a non-viscous area disposed on a side of the viscous area, and the bonding device comprises a fixture disposed on the non-viscous area to stretch the film;

moving the flexible panel into a vacuum chamber by rotating the film via a transport part of the transport element;

stretching an area of the film where the flexible panel disposed, making the flexible panel be suspended in the vacuum chamber;

pumping air out of the vacuum chamber;

raising the flexible panel up to the cover plate by a hump of the bonding jig to bond the cover plate with the flexible panel.

* * * * *